(12) United States Patent
Yang et al.

(10) Patent No.: US 7,386,867 B2
(45) Date of Patent: Jun. 10, 2008

(54) LOCK MECHANISM

(75) Inventors: Min-Cheng Yang, Hsinchu (TW); Jung-Fu Chen, Hsinchu (TW); Cheng-Chung Hsu, Hsinchu (TW); Shih-Lin Yeh, Hsinchu (TW)

(73) Assignee: Lite-On It Corporation, Hsinchu (TW)

( * ) Notice: Subject to any disclaimer, the term of this patent is extended or adjusted under 35 U.S.C. 154(b) by 329 days.

(21) Appl. No.: 11/264,157

(22) Filed: Nov. 2, 2005

(65) Prior Publication Data
US 2007/0028251 A1    Feb. 1, 2007

(30) Foreign Application Priority Data
Jul. 27, 2005    (TW)    .............. 94125475 A (51) Int. Cl.
*G11B 33/02*    (2006.01)

(52) U.S. Cl. .................................... 720/610

(58) Field of Classification Search ............... 720/610
See application file for complete search history.

(56) References Cited

U.S. PATENT DOCUMENTS 6,772,424 B2 *   8/2004   Yeh et al. ................. 720/610
6,925,647 B1 *   8/2005   Kabasawa ................. 720/601
6,954,936 B2 * 10/2005   Ahn ........................... 720/610
6,981,270 B2 * 12/2005   Wu ............................ 720/610
7,073,183 B2 *   7/2006   Hekizono ................. 720/610

* cited by examiner

*Primary Examiner*—Joseph Feild
*Assistant Examiner*—Mark Blouin
(74) *Attorney, Agent, or Firm*—Rosenberg, Klein & Lee (57) ABSTRACT

This invention discloses a lock mechanism. The lock mechanism comprises a tray, a locking element, a solenoid, a linked apparatus, a first arm and a boss. The locking element has a protrusion and is rotably fixed on the tray. The solenoid is fixed on the tray and supplies a magnetic force to an active block. The linked apparatus is connected with the active block of the solenoid and is rotably fixed on the tray to push the locking element. The first arm is rotably fixed on the tray to push the linked apparatus and has a protruding rib to push against the protrusion of the locking element. The boss cooperates with the locking element when the tray is loaded. According to this mechanism, the sounds resulted from the locking element and the first arm are happened at the same time.

14 Claims, 14 Drawing Sheets

LOCK MECHANISM

FIELD OF THE INVENTION

This invention generally relates to a lock mechanism and, more particularly to a lock mechanism applying in an optical disc device.

BACKGROUND OF THE INVENTION

Figure 1:
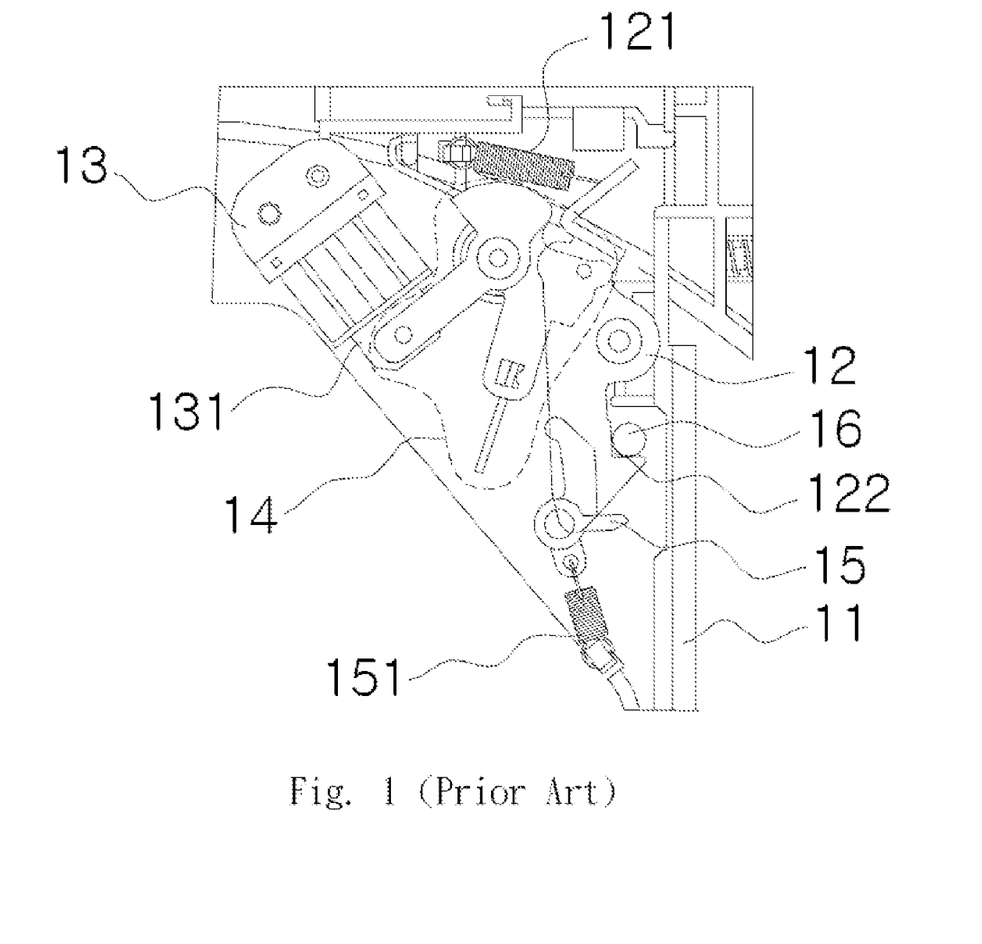
FIG. 1 is a schematic diagram of a conventional lock mechanism.
Figure 2:
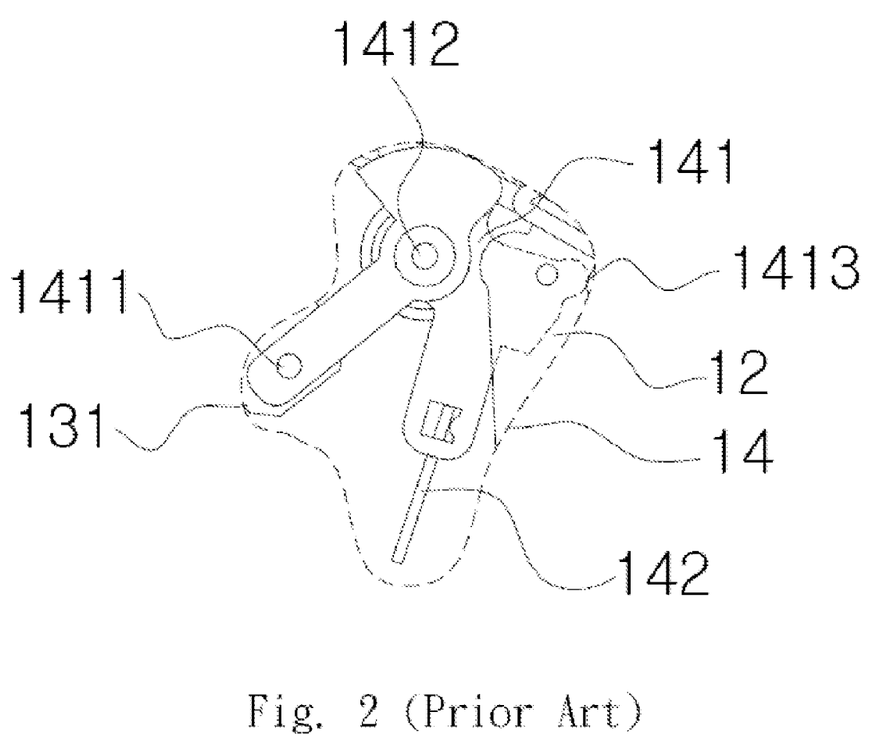
FIG. 2 is a schematic diagram of a linked apparatus of a conventional lock mechanism.

The optical disc device is now in widespread use in personal computers. Recently, the thickness of the optical disc device is reduced and is set in laptops. According to the slim-type optical disc device, the solenoid is usually used to be a power of the ejection mechanism of the tray. Referring to FIG. 1, FIG. 2, FIG. 3, FIG. 4, and FIG. 5, schematic diagrams of a conventional lock mechanism of a tray and the lock mechanism at different states are illustrated. Referring to FIG. 1 and FIG. 2, the conventional lock mechanism comprises a tray 11, a locking element 12, a solenoid 13, a linked apparatus 14, a first arm 15, and a boss 16. The locking element 12 is connected with a first elastic device 121 that is rotably fixed on the tray 11. The solenoid 13 is fixed on the tray 11 to provide a magnetic force and includes an active block 131 which is set in a side of the solenoid 13. The linked apparatus 14 is connected with the active block 131 and is rotably fixed on the tray 11 to push the locking element 12. The first arm 15 is rotably fixed on the tray 11 to push the linked apparatus 14 and is connected with a third elastic device 151 which provides a force on the first arm 15. The boss 16 cooperates with a hook part 122 of the locking element 12. As shown in FIG. 2, the linked apparatus 14 of the conventional lock mechanism comprises a second arm 141 and a second elastic device 142 with reciprocal linking. A first end 1411 of the second arm 141 is connected with the active block 131. A second end 1412 of the second arm 141 is rotably fixed on the tray 11. A third end 1413 of the second arm 141 is linked the locking element 12. The second elastic device 142 is connected with the second arm 141 and is pushed by the first arm 15. By the way mentioned above, the tray of optical disc device can be loaded and ejected with a disc placed on it.

Figure 3:
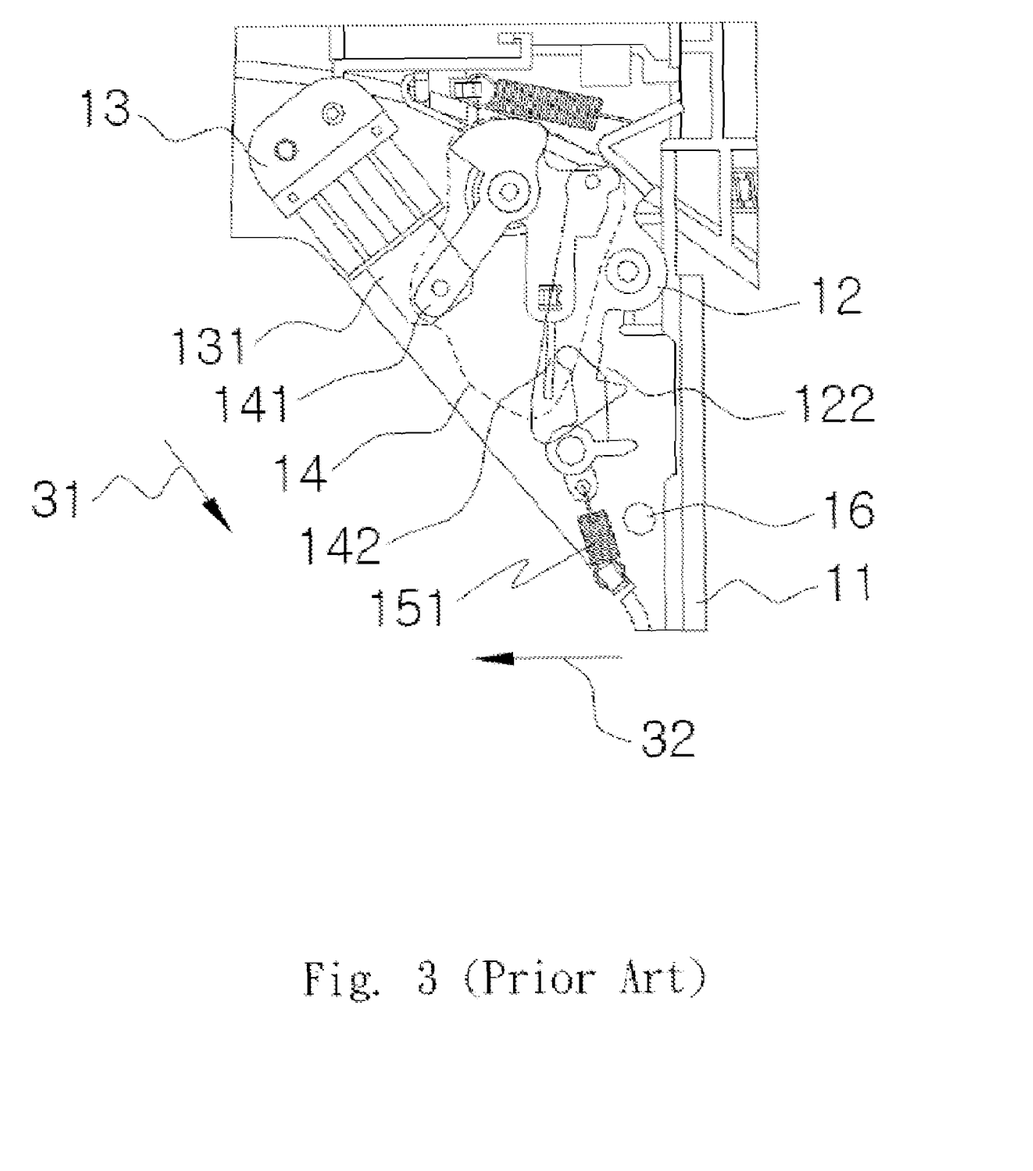
FIG. 3 is a schematic diagram of a conventional lock mechanism at an ejection state.

Referring to FIG. 3, a schematic diagram of a conventional lock mechanism at the ejection state is illustrated. The solenoid is normally kept to have a magnetic force in this illustration. When the magnetic force of the solenoid 13 is removed, the active block 131 parallely springs toward a direction 31 so that the second arm 141 of the linked apparatus 14 then rotates to push the locking element 12 to move toward a direction 32 that enables the hook part 122 of the locking element 12 to depart from the boss 16. Therefore, the tray 11 can be ejected by a force of a compression spring (not shown in FIG. 3).

Figure 4:
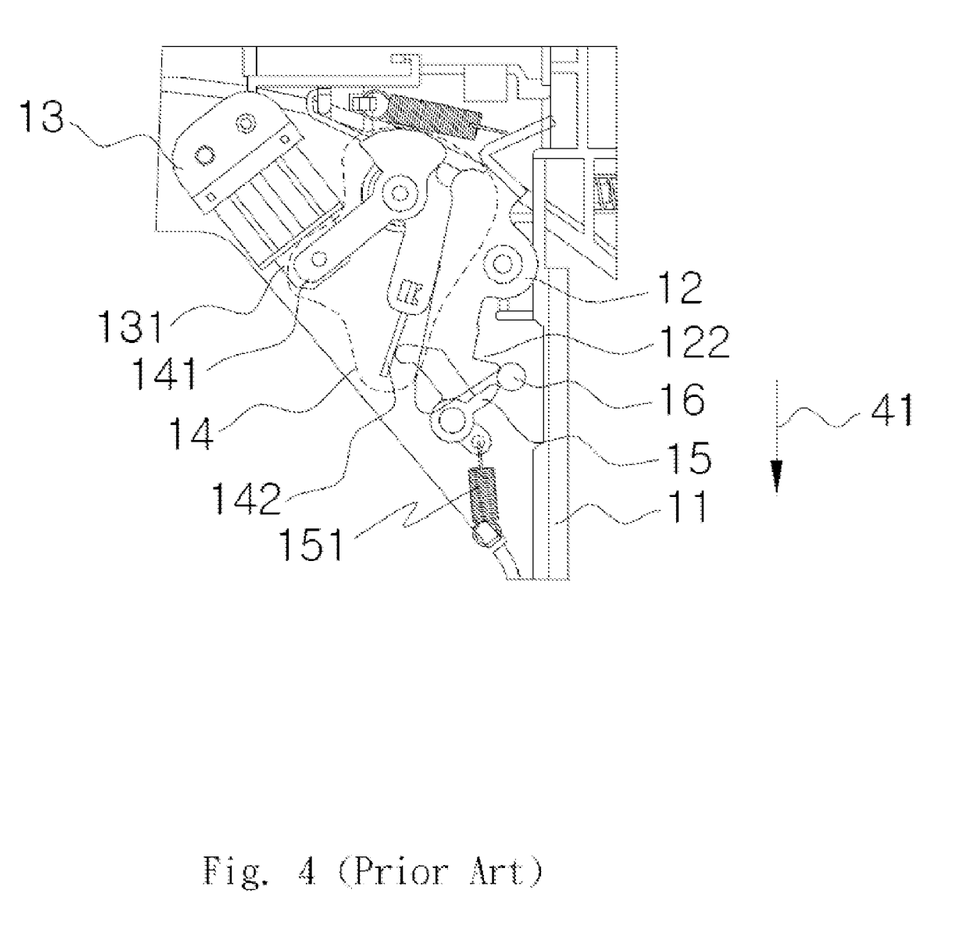
FIG. 4 and FIG. 5 are schematic diagrams of a conventional lock mechanism during tray loading process.
Figure 5:
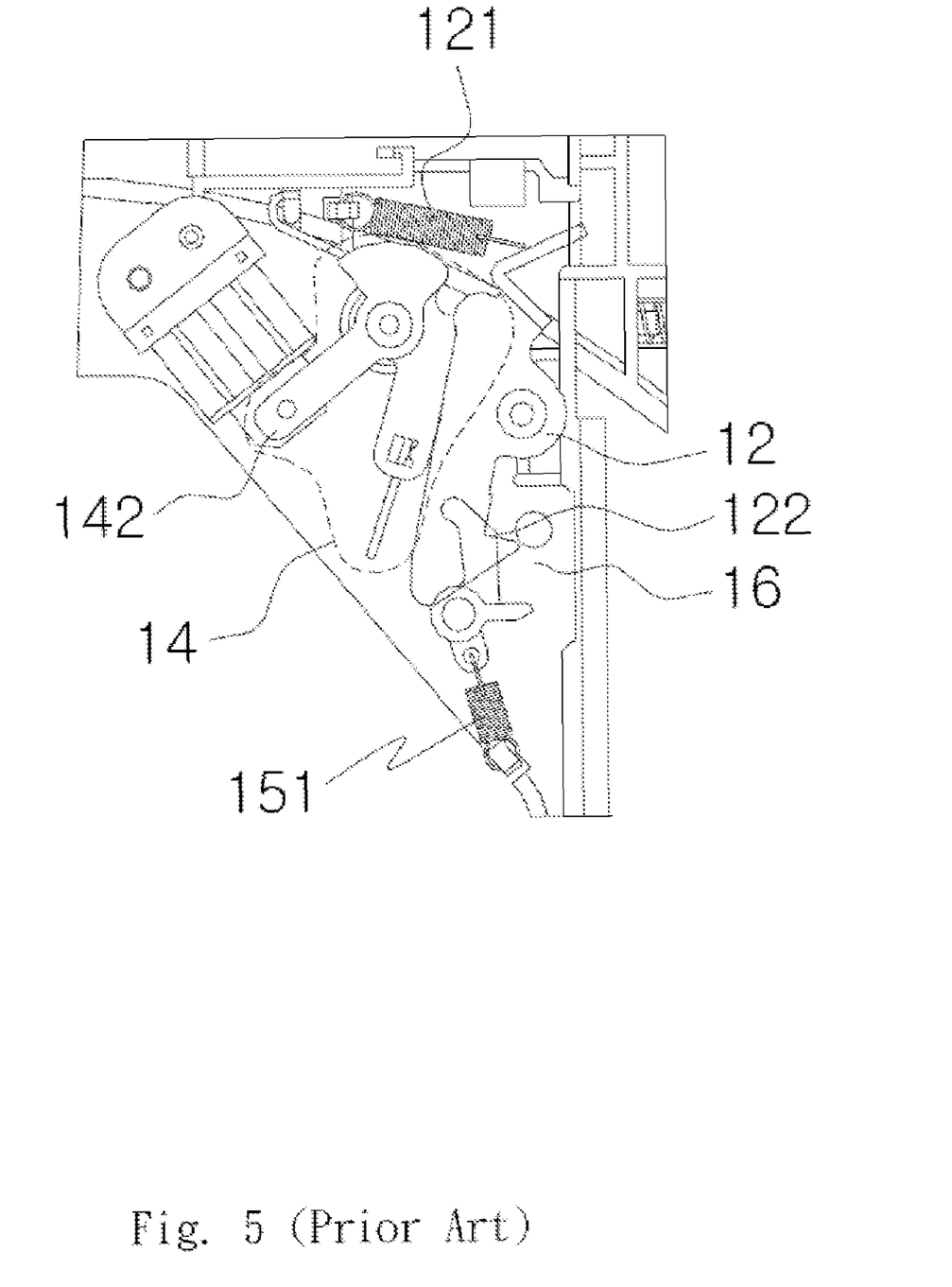

Referring to FIG. 4 and FIG. 5, schematic diagrams of the conventional lock mechanism during tray loading process are illustrated. As shown in FIG. 4, when a user would like to load a CD, the tray 11 can be moved toward a direction 41 that enables the boss 16 to push the first arm 15. The first arm 15 then pushes the second elastic device 142 of the linked apparatus 14, and the linked second arm 141 drives the active block 131 to move toward the inside of the solenoid 13. In another word, the active block 131 can be inhaled by the solenoid 13 again. In the process, the boss 16 departs from the first arm 15 at first. The first arm 15 is sprung back by the pulling force generated from the third elastic device 151. Referring to FIG. 5, because the active block 131 is inhaled by the solenoid 13, the second arm 142 of the linked apparatus 14 releases the locking element 12. The locking element 12 is sprung back by the pulling force generated from the first elastic device 121 that enables the hook part 122 of the locking element 12 to cooperate with the boss 16 again to finish the loading.

In the loading process, the lock mechanism will be producing two sounds, a first sound is a sound generated by the first arm 15 being sprung back and a second sound is a sound generated by the locking element 12 being sprung back. When users hear the first sound, they may feel that the locking element has cooperated already. However, the reality is that the locking element does not cooperate with the boss completely that may confuse users. Hence, there must be some ways to resolve the problem mentioned above by providing a lock mechanism to be a total solution.

SUMMARY OF THE INVENTION

One object of the present invention is to provide a lock mechanism for an optical disc device, which capable of simultaneously producing the sounds generated by the spring back actions of the first arm and the locking element. As there is only one sound that users can hear, users can take the only sound as an indication that the lock action of the lock mechanism is completed.

For achieving the object mentioned above, the present invention provides a lock mechanism. The lock mechanism at least comprises a tray, a locking element, a solenoid, a linked apparatus, a first arm, and a boss. The locking element includes a protrusion, and the first arm includes a protruding rib.

The present invention also provides another lock mechanism. The lock mechanism at least comprises a tray, a locking element, a solenoid, a linked apparatus, a first arm, and a boss. The first arm has a protruding for pushing against the locking element.

According to the present invention, users can only hear one sound while the tray is loading due to the sounds generated by the spring back action of the first arm and the locking element are produced simultaneously.

DETAILED DESCRIPTION OF THE PREFERRED EMBODIMENTS

To make it easier to understand the objective of the invention, its innovative features and performance, a detailed description and technical characteristics of the present invention are described together with the drawings as follows.

Figure 6:
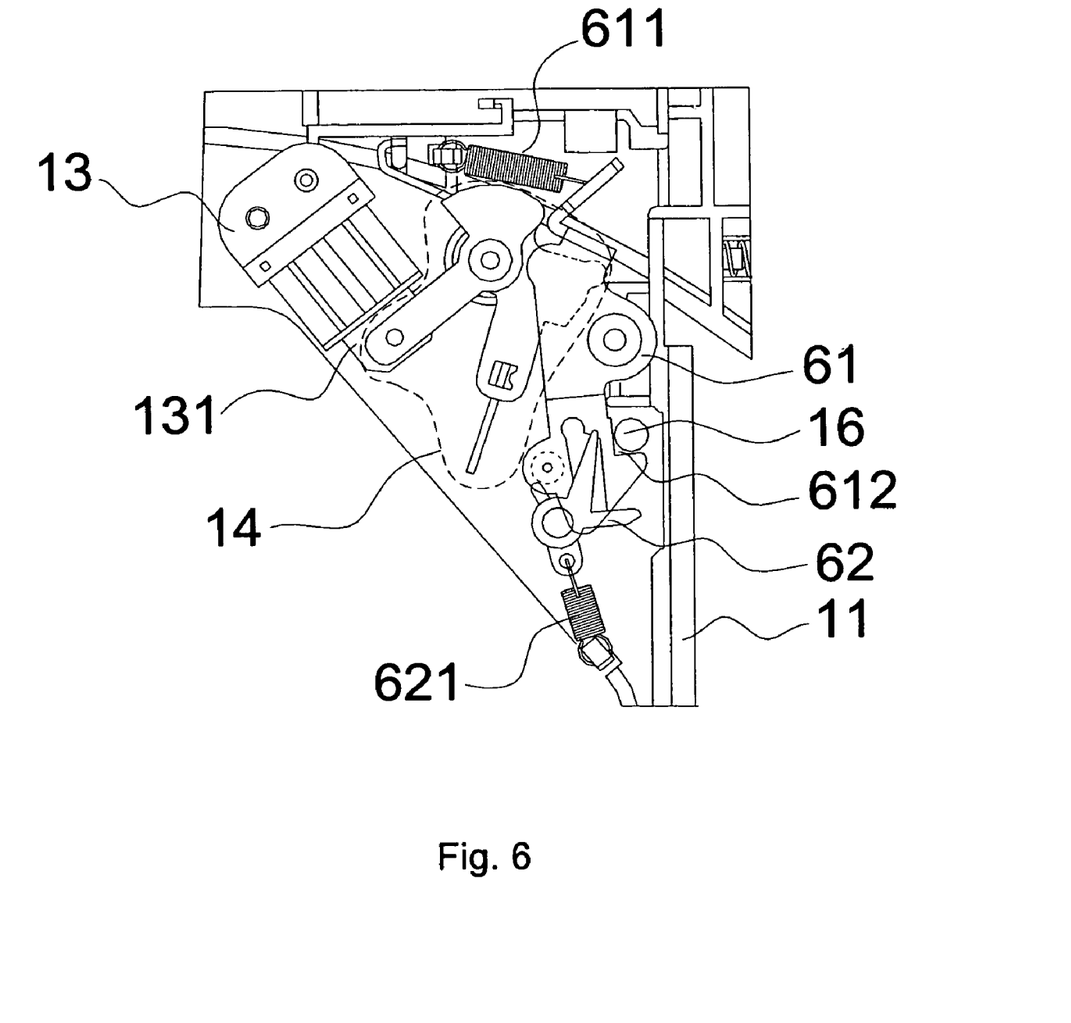
FIG. 6 is a schematic diagram of a lock mechanism according to a first embodiment of the present invention.
Figure 7:
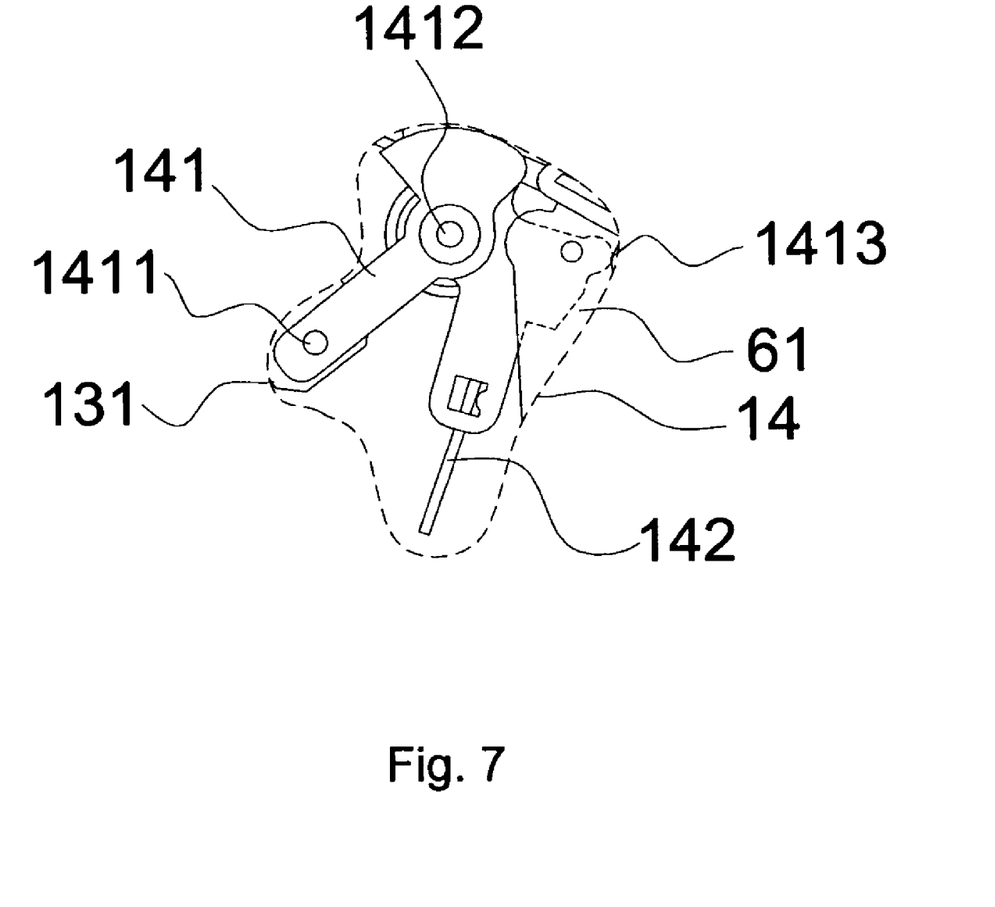
FIG. 7 is a schematic diagram of a linked apparatus of the lock mechanism according to FIG. 6.

FIG. 6, FIG. 7, FIG. 8, FIG. 9 and FIG. 10 are schematic diagrams of a lock mechanism and the lock mechanism during the tray loading process according to a first embodiment of the present invention. Referring to FIG. 6 and FIG. 7, in these preferred embodiments, the lock mechanism at least comprises the tray 11, a locking element 61, the solenoid 13, the linked apparatus 14, a first arm 62, and the boss 16. The structure of the locking element 61 and the structure of the first arm 62 are different from the prior art. The locking element 61 is connected with a first elastic device 611 and is rotably fixed on the tray 11. The solenoid 13 is fixed on the tray 11 to provide a magnetic force and includes the active block 131 which is set in a side of the solenoid 13. The linked apparatus 14 is connected with the active block 131 and is rotably fixed on the tray 11 to push the locking element 61. The first arm 62 is rotably fixed on the tray 11 to push the linked apparatus 14 and is connected with a third elastic device 621 which provides a force on the first arm 62. The boss 16 cooperates with a hook part 612 of the locking element 61. As shown in FIG. 7, the linked apparatus 14 of the first embodiment of the lock mechanism includes the second arm 141 and the second elastic 142 with reciprocal linking. The first end 1411 of the second arm 141 is connected with the active block 131. The second end 1412 of the second arm 141 is rotably fixed on the tray 11. The third end 1413 of the second arm 141 can push the locking element 61. The second elastic device 142 is connected with the second arm 141 and is pushed by the first arm 62. By way of the lock mechanism, the tray of the optical disc device can be loaded and ejected for placing a disc.

Figure 8:
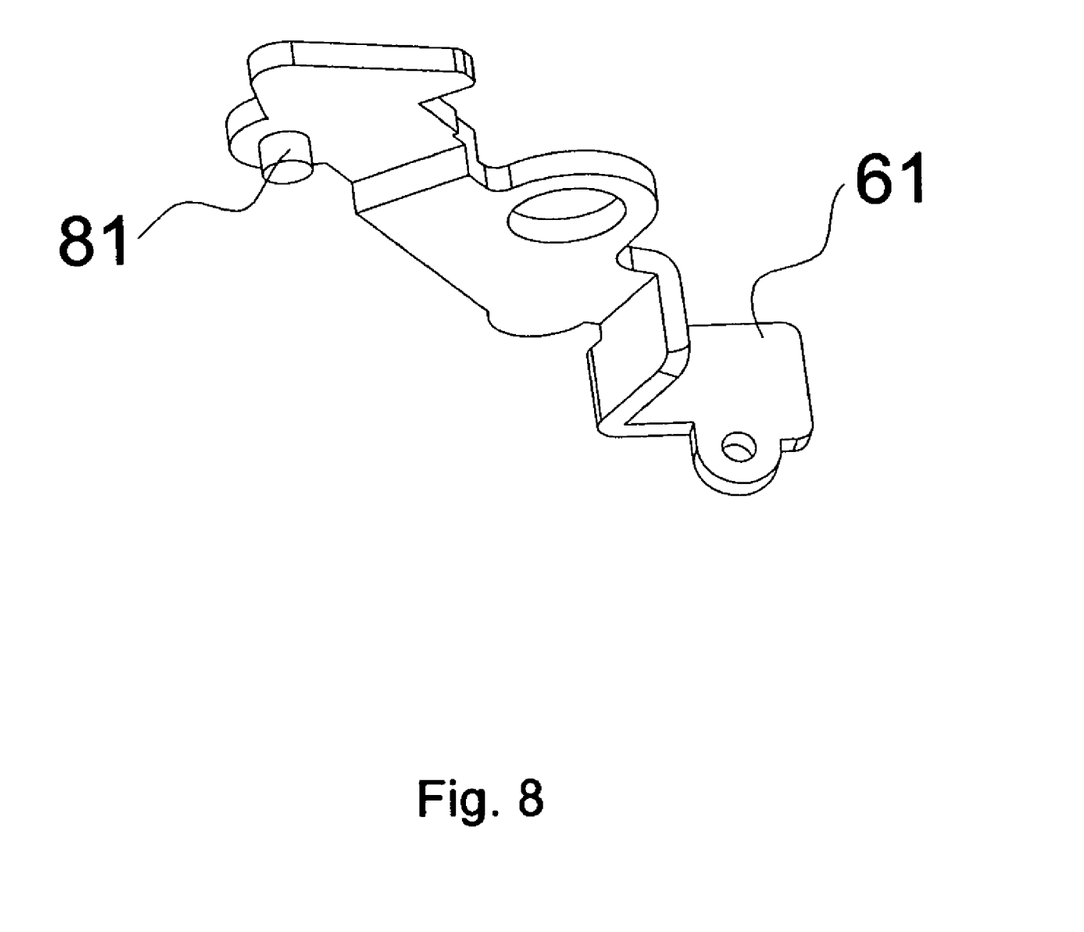
FIG. 8 is a perspective diagram of a locking element of the lock mechanism according to FIG. 6.

Referring to FIG. 8, a perspective diagram of a locking element of the lock mechanism according to the first embodiment of the present invention is illustrated. The locking element 61 includes a protrusion 81 to cooperate with the first arm 62.

Figure 9:
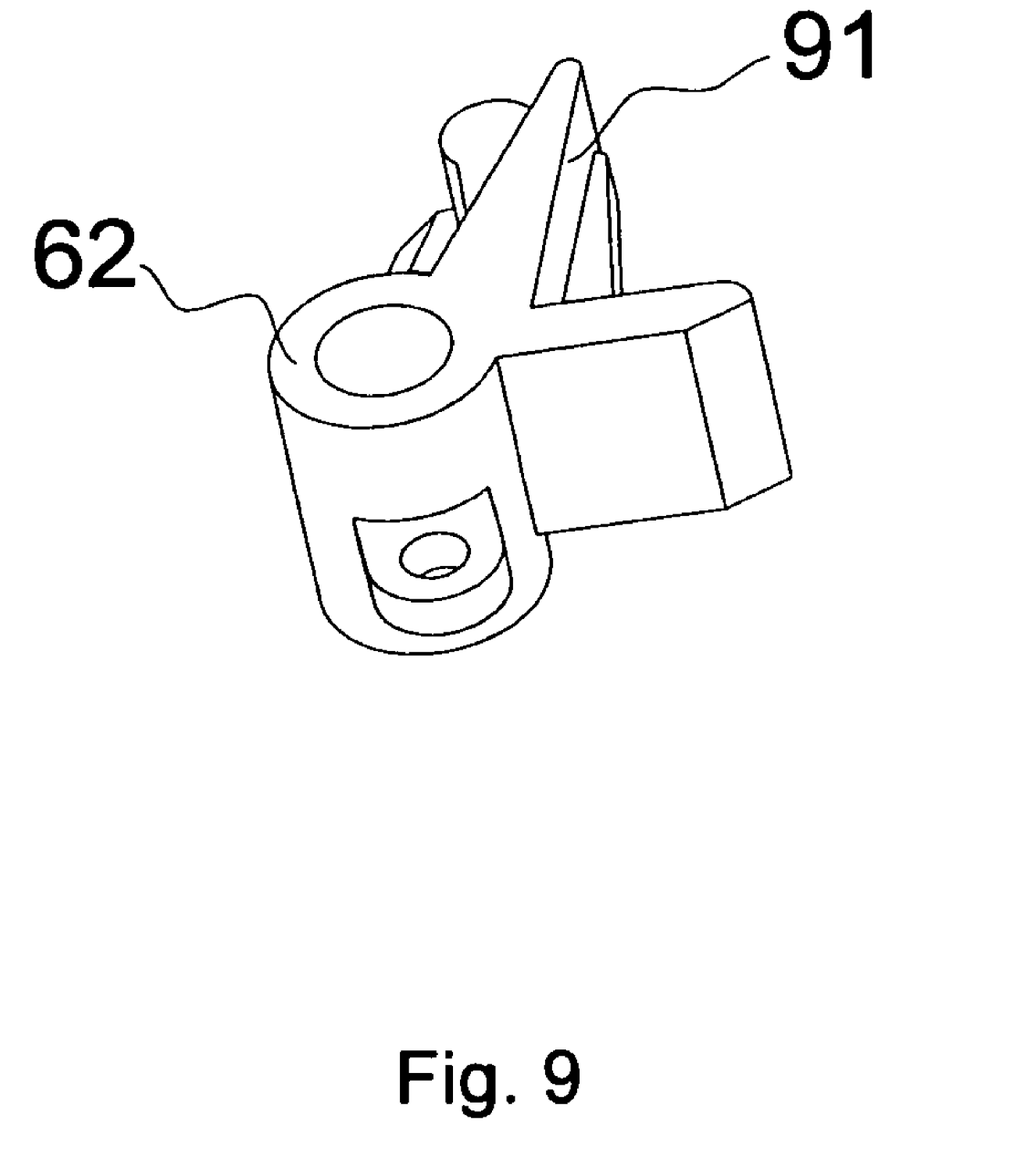
FIG. 9 is a perspective diagram of a first arm of the lock mechanism according to FIG. 6.

Referring to FIG. 9, a perspective diagram of a first arm of the lock mechanism according to the first embodiment of the present invention is illustrated. The first arm 62 includes a protruding rib 91 to be against the protrusion 81 of the locking element 61 in order to push the locking element 61 when the first arm 62 is pushed by the boss 16 during the tray 11 loading process.

Figure 10:
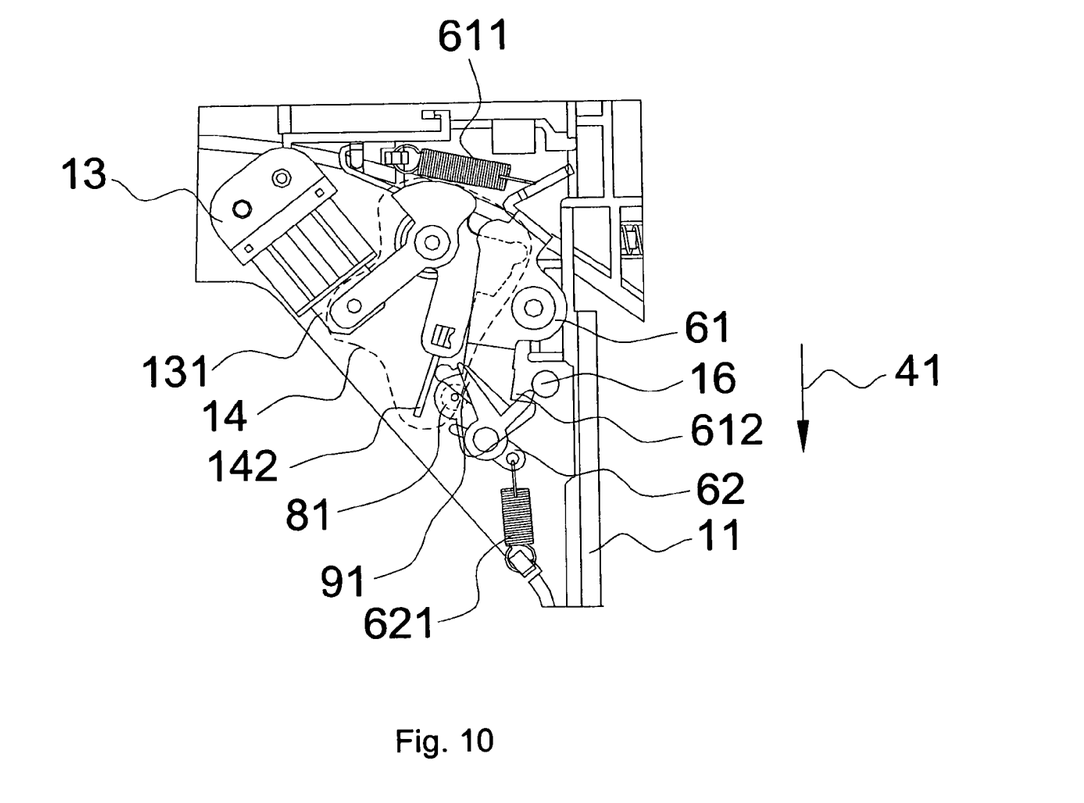
FIG. 10 is a schematic diagram of the lock mechanism during the tray loading process according to FIG. 6.

Referring to FIG. 10, a schematic diagram of the lock mechanism during the tray loading process according to the first embodiment of the present invention is illustrated. When a user would like to load a disc, the tray 11 can be moved toward the direction 41 that enables the boss 16 to push the first arm 62. The first arm 62 then pushes the second elastic device 142 of the linked apparatus 14, and the linked second arm 141 drives the active block 131 to move toward the inside of the solenoid 13. In another word, the active block 131 can be inhaled by the solenoid 13. Therefore, the third end 1413 of the second arm 141 does not push the locking element 61, and the locking element 61 is released. When the boss 16 pushes the first arm 62 to let the active block 131 to be inhaled by the solenoid 13, the protruding rib 91 of the first arm 62 also pushes the protrusion 81 of the locking element 61. Therefore, the locking element 61 is not sprung back even which is released by the second arm 141. The boss 16 is then relatively moved to a location which can be cooperated by the locking element 61 and releases the first arm 62. Therefore, the first arm 62 is sprung back by the pulling force generated from the third elastic device 621, and the locking element 61 is also sprung back by the pulling force generated from the first elastic device 611 at the same time that enables the hook part 612 of the locking element 61 to cooperate with the boss 16 again in order to complete the loading process. By the way mentioned above, the sound generated by the spring back actions of the first arm and the locking element can be produced simultaneously that the user can only hear one sound.

Figure 11:
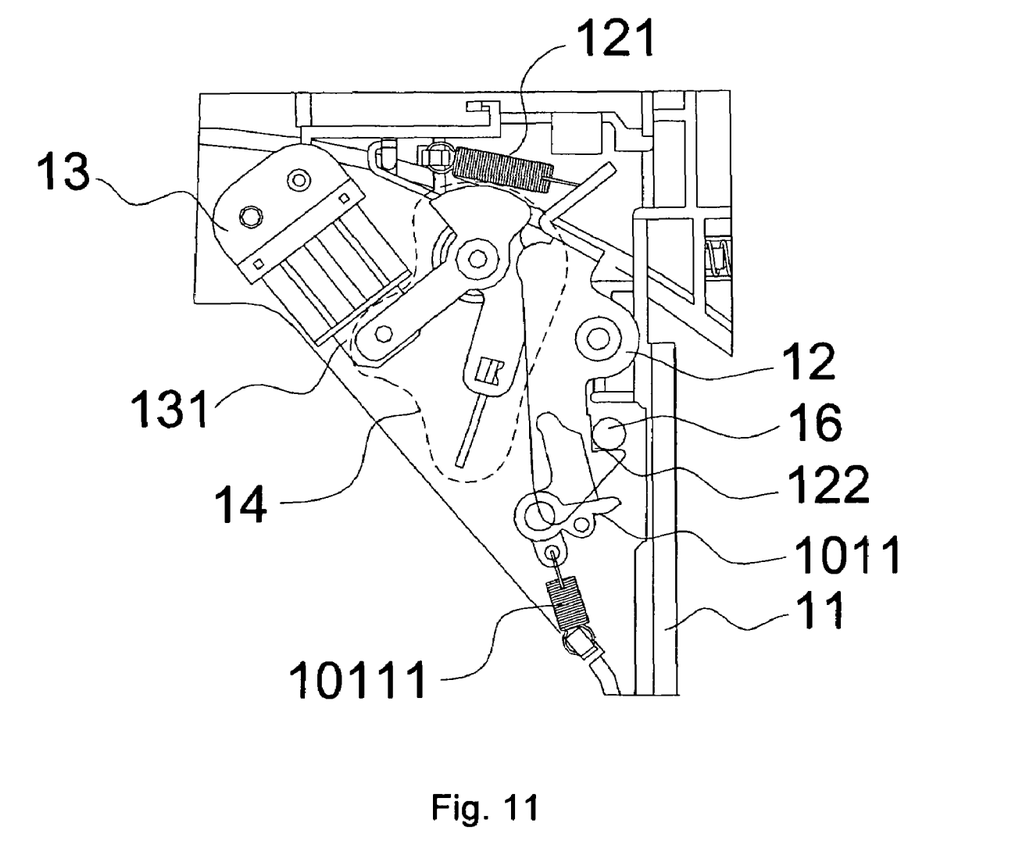
FIG. 11 is a schematic diagram of a lock mechanism according to a second embodiment of the present invention.
Figure 12:
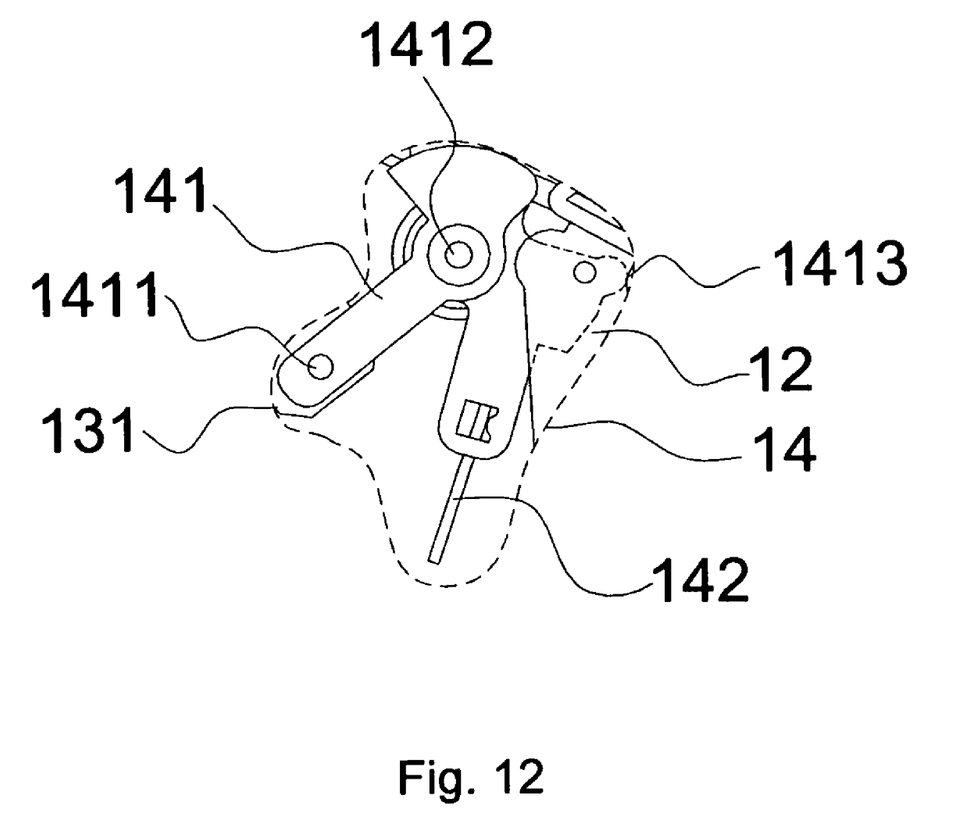
FIG. 12 is a schematic diagram of a linked apparatus of the lock mechanism according to FIG. 11.

FIG. 11, FIG. 12, FIG. 13 and FIG. 14, schematic diagrams of a lock mechanism and the lock mechanism during the tray loading process according to a second embodiment of the present invention are illustrated. Referring to FIG. 11 and FIG. 12, the lock mechanism of the present invention at least comprises the tray 11, the locking element 12, the solenoid 13, the linked apparatus 14, a first arm 1011, and the boss 16. The structure of the first arm 1011 is different from the prior art. The locking element 12 is connected with the first elastic device 121 and is rotably fixed on the tray 11. The solenoid 13 is fixed on the tray 11 to provide a magnetic force and includes the active block 131 which is set in a side of the solenoid 13. The linked apparatus 14 is connected with the active block 131 and is rotably fixed on the tray 11 to push the locking element 12. The first arm 1011 is connected with a third elastic device 10111 and is rotably fixed on the tray 11 to push the linked apparatus 14. The boss 16 cooperates with the hook part 122 of the locking element 12. As shown in FIG. 12, the linked apparatus 14 of the lock mechanism of the present invention includes the second arm 141 and the second elastic device 142 with reciprocal linking. The first end 1411 of the second arm 141 is connected with the active block 131. The second end 1412 of the second arm 141 is rotably fixed on the tray 11. The third end 1413 of the second arm 141 is used to push the locking element 12. The second elastic device 142 is connected with the second arm 141. By way of the lock mechanism, the tray of the optical disc device can be loaded and ejected for placing a disc.

Figure 13:
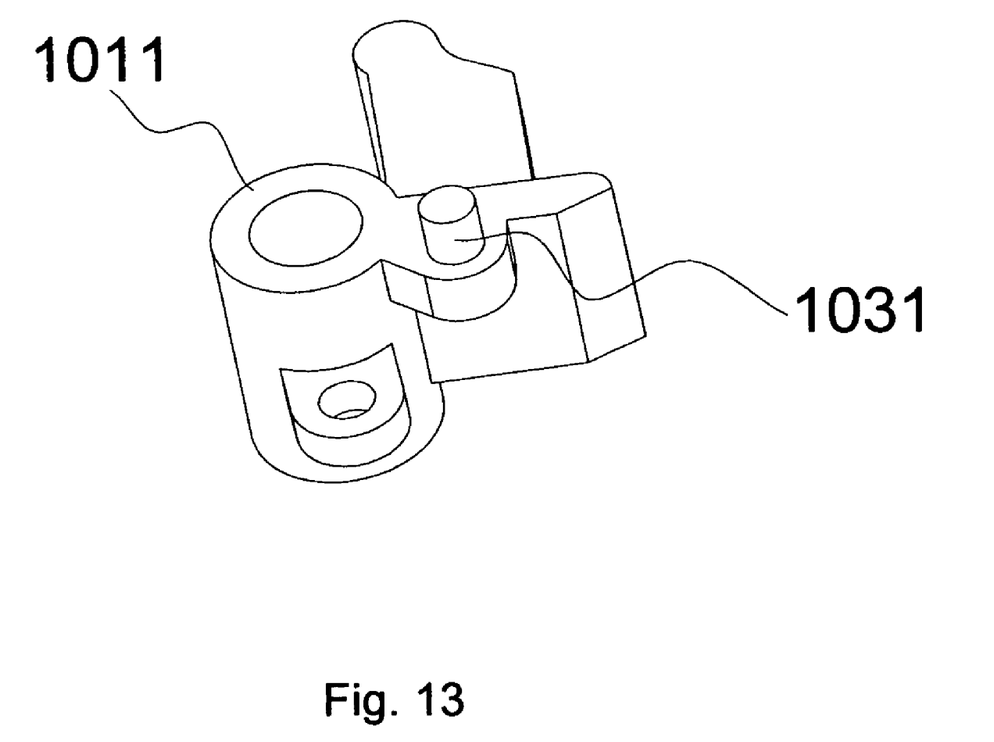
FIG. 13 is a perspective diagram of a first arm of the lock mechanism according to FIG. 11.
Figure 14:
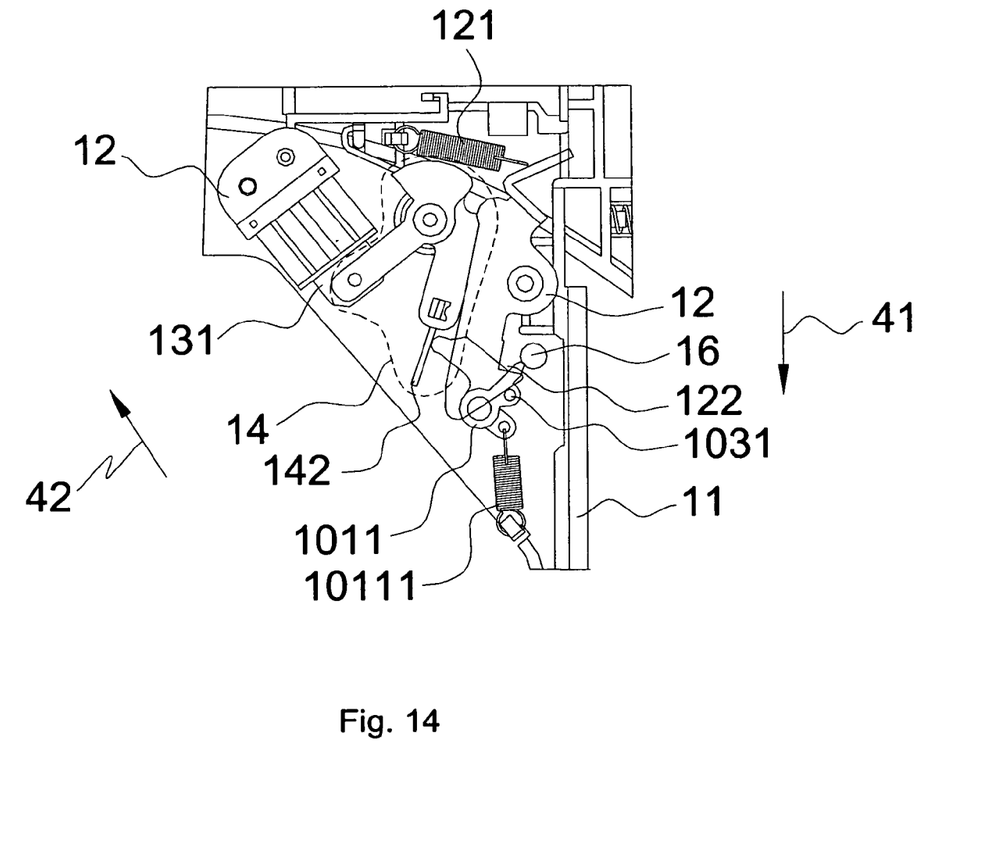
FIG. 14 is a schematic diagram of the lock mechanism during the tray loading process according to FIG. 11.

Referring to FIG. 13, a perspective diagram of a first arm of the lock mechanism according to the second embodiment of the present invention is illustrated. The first arm 1011 includes a protrusion 1031 to push the locking element 12. Referring to FIG. 14, a schematic diagram of the lock mechanism during the tray loading process according to the second embodiment of the present invention is illustrated. When a user would like to load a disc, the tray 11 is moved toward the direction 41 that enables the boss 16 to push the first arm 1011. The first arm 1011 then pushes the second elastic device 142 of the linked apparatus 14, and the linked second arm 141 drives the active block 131 to move toward the direction 42 and releases the locking element 12. In another word, the active block 131 can be inhaled by the solenoid 13. When the boss 16 pushes the first arm 1011, therefore, to release the locking element 12, the protrusion 1031 of the first arm 1011 pushes the locking element 12 simultaneously. The boss 16 is then further relatively moved to the location which cooperates with the locking element 12 and releases the first arm 1011. The firs arm 1011 is sprung back by the pulling force generated from the third elastic device 10111, and the locking element 12 is also sprung back by the pulling force generated from the first elastic device 121 at the same time that enables the hook part 122 of the locking element 12 to cooperate with the boss 16 to complete the loading. By the way mentioned above, the sounds generated by the spring back actions of the first arm 1011 and locking element 12 can be produced simultaneously that the user can only hear one sound.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the description above, the present invention is novel and useful and definite enhances the performance over the conventional structure and further complies with the patent application requirements and is submitted to the Patent and Trademark Office for review and granting of the commensurate patent rights.

What is claimed is:

1. A lock mechanism, applied in an optical disc device, comprising:
   a tray;
   a locking element having a protrusion, rotably fixed on the tray;
   a solenoid fixed on the tray, providing a magnetic force, and having an active block;
   a linked apparatus, connected with the active block, rotably fixed on the tray to push the locking element;
   a first arm, rotably fixed on the tray to push the linked apparatus, wherein the first arm includes a protruding rib to push against the protrusion; and
   a boss, cooperating with the locking element.

2. The lock mechanism of claim 1, wherein the locking element connects with a first elastic device.

3. The lock mechanism of claim 2, wherein the first elastic device is a tension spring.

4. The lock mechanism of claim 1, wherein the linked apparatus includes a second arm and a second elastic device with reciprocal linking, the second arm includes a first end, a second end, and a third end, the first end is connected with the active block, the second end is rotably fixed on the tray, the third end is used to push the locking element, and the second elastic apparatus is connected with the second arm and is pushed by the first arm.

5. The lock mechanism of claim 4, wherein the second elastic device is a torque spring.

6. The lock mechanism of claim 1, wherein the first arm is connected with a third elastic device.

7. The lock mechanism of claim 6, wherein the third elastic device is a tension spring.

8. A lock mechanism, applied in an optical disc device, at least comprising:
   a tray;
   a locking element, rotably fixed on the tray;
   an solenoid, fixed on the tray, providing a magnetic force, and having a active block;
   a linked apparatus, connected with the active block, rotably fixed on the tray to push the locking element;
   a first arm, rotably fixed on the tray to push the linked apparatus, wherein the first arm has a protrusion to push against the locking element; and
   a boss, cooperating with the locking element.

9. The lock mechanism of claim 8, wherein the locking element is connected with a first elastic device.

10. The lock mechanism of claim 9, wherein the first elastic device is a tension spring.

11. The lock mechanism of claim 8, wherein the linked apparatus includes a second arm and a second elastic device with reciprocal linking, the second arm includes a first end, a second end, and a third end, the first end is connected with the active block, the second end is rotably fixed on the tray, the third end is used to push the locking element, and the second elastic device is connected with the second arm and is pushed by the first arm.

12. The lock mechanism of claim 11, wherein the second elastic device is a torque spring.

13. The lock mechanism of claim 8, wherein the first arm is connected with a third elastic device.

14. The lock mechanism of claim 13, wherein the third elastic device is a tension spring.

* * * * *